(12) United States Patent
Owaki

(10) Patent No.: US 6,590,792 B2
(45) Date of Patent: Jul. 8, 2003

(54) NOISE CANCELING CIRCUIT HAVING A CHANGEOVER DEVICE

(75) Inventor: Ryoji Owaki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/941,866

(22) Filed: Aug. 30, 2001

(65) Prior Publication Data

US 2002/0024372 A1 Feb. 28, 2002

(30) Foreign Application Priority Data

Aug. 30, 2000 (JP) ........................................ 2000-260615

(51) Int. Cl.[7] .............................. H02M 1/12; H02M 1/14
(52) U.S. Cl. ............................. 363/39; 363/44; 363/52
(58) Field of Search ............................ 363/39, 44, 50, 363/52

(56) References Cited

U.S. PATENT DOCUMENTS

| | | | | |
|---|---|---|---|---|
| 4,016,458 A | * | 4/1977 | Everhart | 361/18 |
| 4,236,198 A | * | 11/1980 | Ohsawa et al. | 323/908 |
| 4,713,598 A | * | 12/1987 | Smith | 323/245 |
| 5,572,415 A | * | 11/1996 | Mohan | 363/126 |
| 5,836,253 A | * | 11/1998 | Kunka | 104/296 |
| 5,838,555 A | * | 11/1998 | Lejeune et al. | 363/128 |
| 6,163,470 A | * | 12/2000 | Chavez et al. | 323/908 |

* cited by examiner

*Primary Examiner*—Bao Q. Vu
(74) *Attorney, Agent, or Firm*—Oliff & Berridge, PLC

(57) ABSTRACT

A noise canceling circuit that eliminates noise from an AC current of an AC power supply is provided with a changeover device that brings the noise canceling circuit into and out of conduction with a secondary side of a transformer in accordance with an on-off state of a switch. The noise canceling circuit includes a filter portion. The changeover device may be a relay or triac.

8 Claims, 4 Drawing Sheets

NOISE CANCELING CIRCUIT HAVING A CHANGEOVER DEVICE

BACKGROUND OF THE INVENTION

1. Field of Invention

This invention relates to a noise canceling circuit for canceling noise included in alternating (AC) current supplied from an AC power supply in various kinds of electric appliances for household use and office-automation use, such as a sewing machine, facsimile machine or a printer.

2. Description of Related Art

Generally, in electric appliances for household use and office-automation use, such as a facsimile machine, printer or sewing machine, a power supply that activates various circuits is structured to acquire direct current (DC) from a commercial AC power supply by stepping up or down the AC current from the commercial AC power supply with a transformer. The AC current is then rectified in a half-wave or full-wave rectifier circuit, and smoothed in a smoothing circuit having a capacitor.

However, the AC current may include noise that is generated, for example, because of interference with other electric appliances, or noise that is generated internally in the electric appliance itself. Conventionally, a noise canceling circuit for eliminating noise has been provided in a power supply.

FIG. 5 illustrates a configuration of a power supply 21 including a noise canceling circuit 28 of the prior art. In the power supply 21, the primary (input) side of a transformer 23 is connected to opposite ends of an AC power supply 22, and the secondary (output) side of the transformer 23 is connected to a half-wave or full-wave rectifier circuit 24. The DC output side of the rectifier circuit 24 is connected to a smoothing circuit 25 for smoothing a pulsing current that is taken from the rectifier circuit 24. One end of the DC output side of the smoothing circuit 25 is connected to a load 26. The other end of the DC output side of the smoothing circuit 25 is connected to a grounding member, such as a machine frame of metal construction.

Capacitors 29a, 29b, 29d are connected between the AC power supply 22 and the primary side of the transformer 23. One end of the secondary side of the transformer 23 is connected between the capacitors 29a, 29b via capacitor 29c. In addition, a rocker (seesaw) switch 27 for switching the AC current on or off is disposed between one end of the AC power supply 22 and the capacitor 29a. A circuit connecting the primary side and the secondary side of the transformer 23 via a filter portion 29 composed of the capacitors 29a to 29d corresponds to the noise canceling circuit 28.

In this configuration, when the rocker switch 27 is switched on, the noise included in the AC current from the AC power supply 22 is discharged to the secondary side of the transformer 23 via the capacitors 29a to 29d. Accordingly, in the noise canceling circuit 28, the noise is eliminated from the AC current from the AC power supply 22, and stable AC current is supplied to the primary side of the transformer 23.

A problem exists, however, with the configuration of the prior art. Even with the rocker switch 27 off, the electric current flows from the AC power supply 22 through the capacitors 29a to 29d to the grounding member. The current flows over two paths. One is from the capacitor 29b to the capacitor 29c. The other one is from capacitor 29d through the capacitor 29a to the capacitor 29c because the primary side and the secondary side of the transformer 23 are connected via the filter portion 29. Therefore, when the operator touches the grounding member while the rocker switch is in the OFF position, an electrical shock proportional to a quantity of electricity accumulated in the capacitors 29a to 29d may result.

SUMMARY OF THE INVENTION

This invention provides a noise canceling circuit that overcomes the foregoing problem. To solve this problem, one embodiment of the invention has a noise canceling circuit with a filter portion including a capacitor or an inductor. This filter portion is used to connect a primary (input) side and secondary (output) side of a transformer via the filter portion in order to eliminate noise included in AC current supplied at the primary side of the transformer. The noise canceling circuit further includes a changeover device that brings the filter portion and the secondary side of the transformer into (or out of) conduction in accordance with an on-off state of a switching device disposed between the AC power supply and the noise canceling circuit. The changeover device is disposed between the filter portion and the secondary side of the transformer.

In another embodiment of the invention, the changeover device is a triac. In this configuration, when the switch device is on, the AC current from the AC power supply is stepped up or down by means of a transformer, and the AC current induced to the secondary side of the transformer is rectified in the rectified circuit. Simultaneously, the changeover device disposed between the filter portion and the secondary side of the transformer brings the filter portion and the secondary side of the transformer into conduction in accordance with an on state of the switch device. The noise included in the AC current from the AC power supply is discharged to the secondary side of the transformer via the filter portion and the changeover device. The pulsing current taken from the rectifier circuit is smoothed in the smoothing circuit, to allow DC current to be obtained.

As the noise is discharged to the secondary side of the transformer, via the filter portion and the changeover device, the noise canceling circuit according to the invention enables the noise to be eliminated from the AC current from the AC power supply. Thus, a stable AC current can be supplied to the primary side of the transformer.

When the switching device is off; the changeover device brings the filter portion and the secondary side of the transformer out of conduction in accordance with an off state of the switching device. In this case, because there is no continuity between the filter portion and the secondary side of the transformer, the current never flows to the secondary side of the transformer, and by extension never flows to the grounding member. Therefore, even if the operator touches the grounding member, there is no danger of receiving an electrical shock.

In a simple configuration, a triac is disposed between the filter portion and the secondary side of the transformer. The filter portion and the secondary side of the transformer can be brought into or out of conduction in accordance with the on-off state of the switching device, without a control device such as a microcomputer.

BRIEF DESCRIPTION OF THE DRAWINGS

The invention will be described in greater detail with reference to preferred embodiments thereof and the accompanying drawings wherein.

DETAILED DESCRIPTION OF PREFERRED EMBODIMENTS

The invention will be described in detail with reference to the accompanying drawings. It should be understood that the invention is not limited in its application to the details of structure and the arrangement of parts illustrated in the accompanying drawings. The invention is capable of other embodiments and of being practiced or performed in various ways without departing from the technical idea thereof, based on existing and well-known techniques among those skilled in the art. The invention can be applied to a noise canceling circuit provided in a power supply used in all sorts of electric appliances for household use and office-automation use, such as a sewing machine, facsimile machine and a printer.

Figure 1:
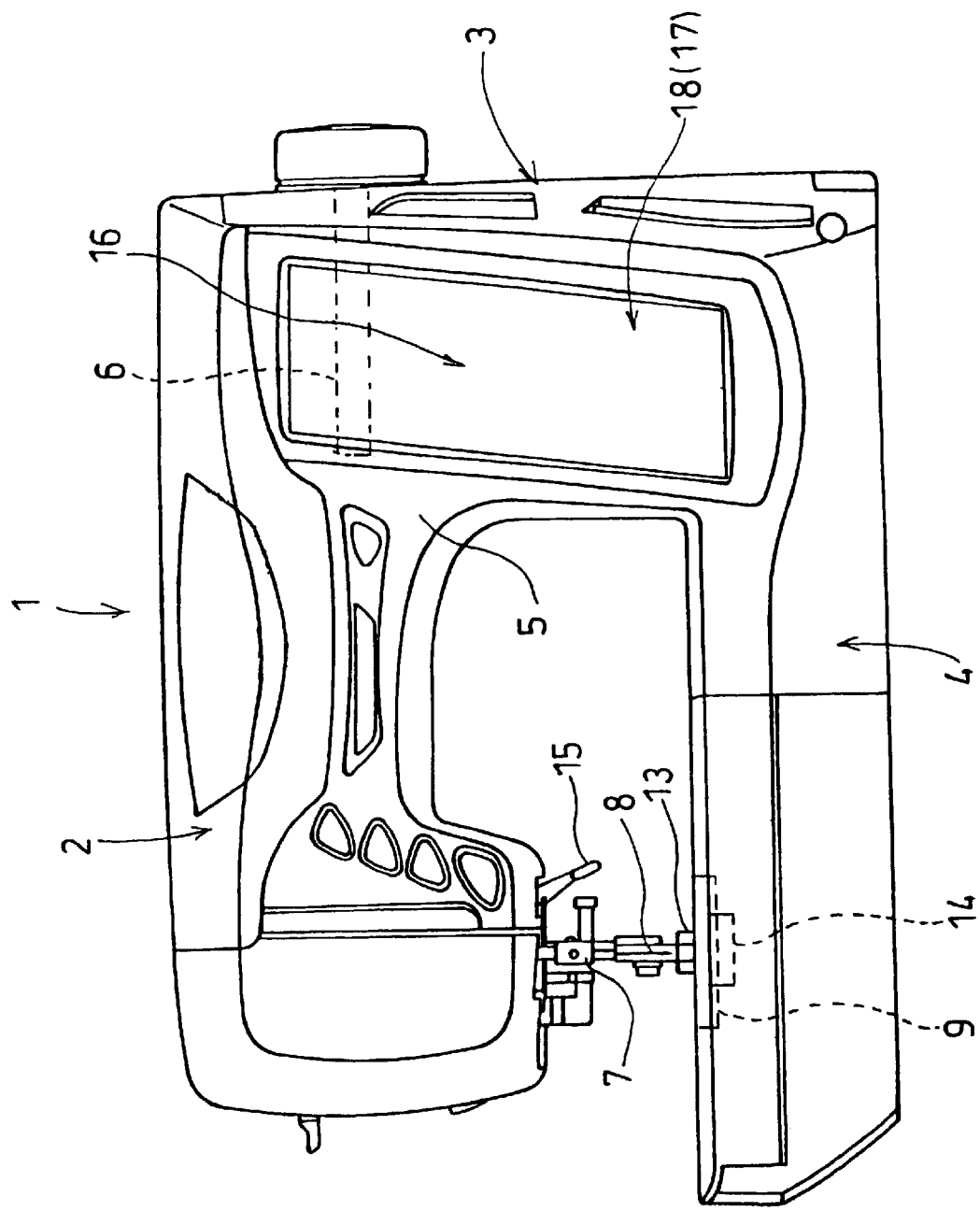
FIG. 1 is a front view of a sewing machine to which the invention may be applied.

FIG. 1 is a typical and exemplary sewing machine that may use the device of this invention. The sewing machine 1 with an embroidery function includes an aluminum die-cast machine frame made of an arm portion 2, a standard portion 3 and a bed portion 4, and a cover 5 of synthetic resin such as polypropylene, which covers the machine frame. The machine frame functions as a grounding member and is grounded from a power supply. A part of an upper surface of the bed portion 4 of the machine frame is exposed from the cover 5.

Inside the arm portion 2 is disposed a main shaft 6 that is linked to a driving unit (not shown), for example, a motor, for transmitting a rotary motion in a predetermined direction to the main shaft 6. The main shaft 6 is linked to a needle bar 7 that moves up and down by rotation of the main shaft 6. A needle 8 is secured at a bottom end of the needle bar 7.

Figure 2:
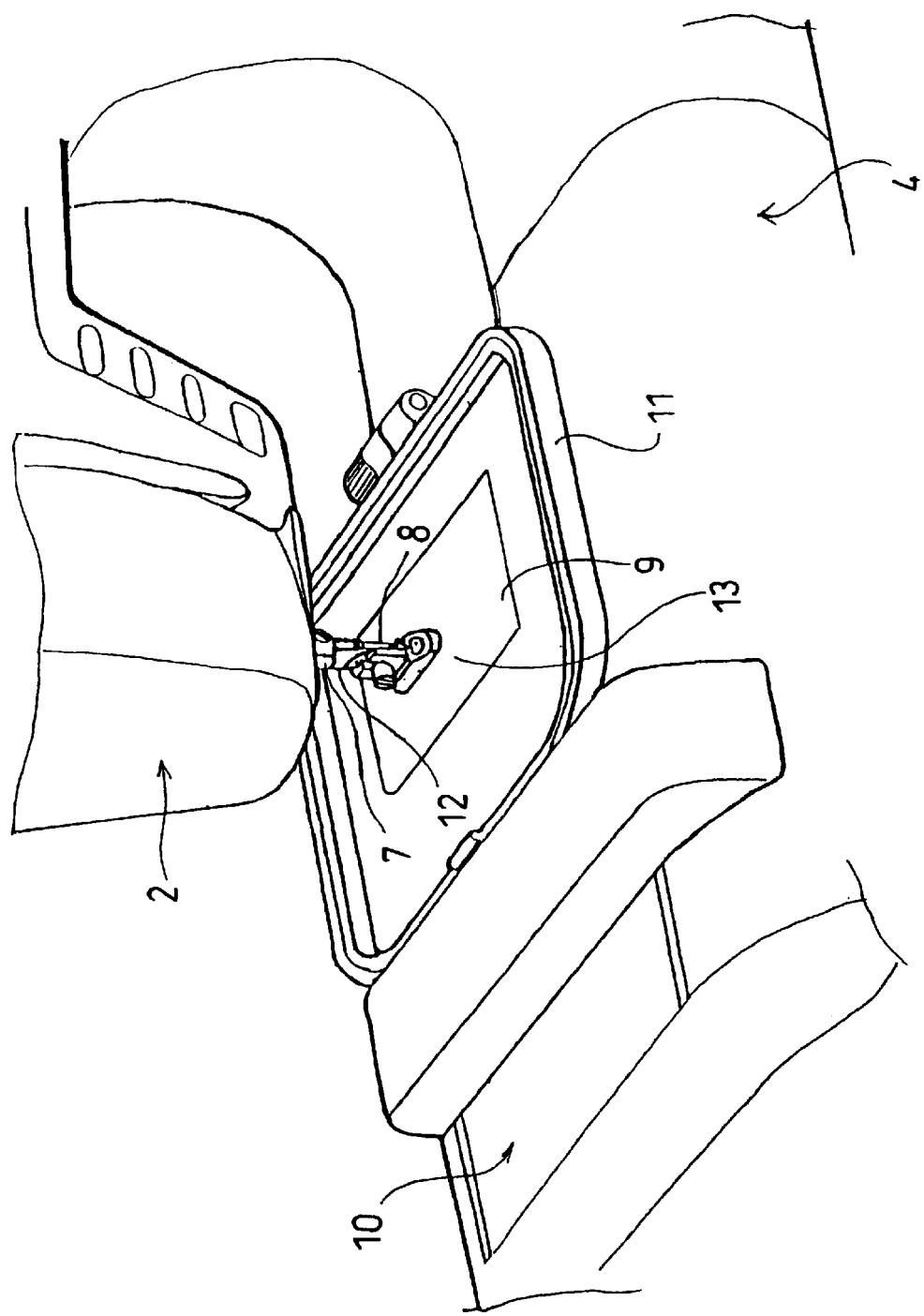
FIG. 2 is a perspective view showing an operating state of the sewing machine.

As shown in FIGS. 1 and 2, a detachable embroidery table 10 and a needle plate 9 that receives a cloth on a top surface thereof are disposed on one end of the bed portion 4. The embroidery table 10 is structured so as to attach an embroidery frame 11 that holds a cloth to be sewn (not shown) under a tension detachably thereto. The needle plate 9 has holes in which a feed dog 14 can be freely fit (not shown) and a hole (not shown) into which the needle 8 is inserted.

An X stepping motor (not shown) that drives the embroidery table 10 in an X direction and an Y stepping motor (not shown) that drives the embroidery table 10 in an Y direction are disposed inside bed portion 4.

A presser bar 12 (FIG. 2) is supported by the arm portion 2 of the sewing machine 1 so as to be vertically movable. Attached at the bottom end of the presser bar 12 (FIG. 2), is a cloth presser 13, which presses downward by means of a spring (not shown). The cloth presser 13 can be moved vertically to a raised or lowered position through manual operation by an operator, or automatically controlled by means of a motor.

The feed dog 14, which is disposed in the bed portion 4 opposed to the cloth presser 13, moves vertically and horizontally and cooperates with the cloth presser 13 to feed a cloth. For embroidering where the embroidery frame 11 is moved, the feed dog 14 is selectively lowered below the needle plate 9. For every one stitch made, the presser bar 12 moves vertically in accordance with the vertical movement of the needle bar 6, by means of the automatic presser bar lifting mechanism 15 of the sewing machine 1, so that it presses or releases a cloth to be sewn.

A liquid crystal display unit 16, where a touch panel 18 is disposed on the liquid crystal display (LCD) 17, is secured to substantially a middle of the standard portion 3 at the front surface. In the liquid crystal display unit 16, images of function buttons, such as an input button are displayed on the display image surface of the LCD 17 in place, and are visible from the surface of the touch panel 18.

When the operator presses a portion corresponding to an image displayed on the touch panel 18 with his/her finger or a pen, the touch panel 18 detects the place the operator has pressed. Information about the place the operator has pressed is transmitted to a control device (not shown) that performs various operations by means of a flexible printed circuit board, and a function assigned to the place the operator has pressed (for example, embroidering where the embroidery frame 11 is moved) is then performed.

In this arrangement, the needle 8 moves up and down as the needle bar 7 moves up and down. The needle 8, with an upper thread passed through the needle eye, moves into and out of a cloth to catch a lower thread set in a rotary hook (not shown), which is disposed below the needle plate 9, thereby making stitches on the cloth.

For embroidering where the embroidery frame 11 is moved, in the control device, a synergetic relationship between the stepping motors and the needle bar 7 is controlled based on each piece of sewing data for various embroidery patterns stored in, for example, a ROM. Various patterns can be formed on a material to be embroidered which is stretched taut in the embroidery frame 11.

A configuration of a power supply 31 within sewing machine 1 having a noise canceling circuit 32 of the invention will be described with reference to FIG. 3.

In a first embodiment, a triac 33 is connected to the capacitor 29c of the filter portion 29 and one end of the secondary side of the transformer 23. The triac 33 is structured to pass or stop a current between the filter portion 29 and the secondary side of the transformer 23 in accordance with the on-off state of the rocker switch 27.

In the first embodiment, parts having the same structure and functions as those of the prior art are identified with the same numerals and their detailed descriptions are omitted. Although it is not shown, the load 26 may take any form, such as motors, a backlight power supply for the LCD 17 or other parts, and the rocker switch 27 is attached to an end of the standard portion 3.

The triac 33 includes two main electrodes T1, T2, and a gate electrode G. The triac 33 passes a current between the main electrodes T1, T2 in both directions when the current flows through the gate electrode G, and stops the current between the main electrodes T1, T2 when the current does not flow through the gate electrode G.

Figure 3:
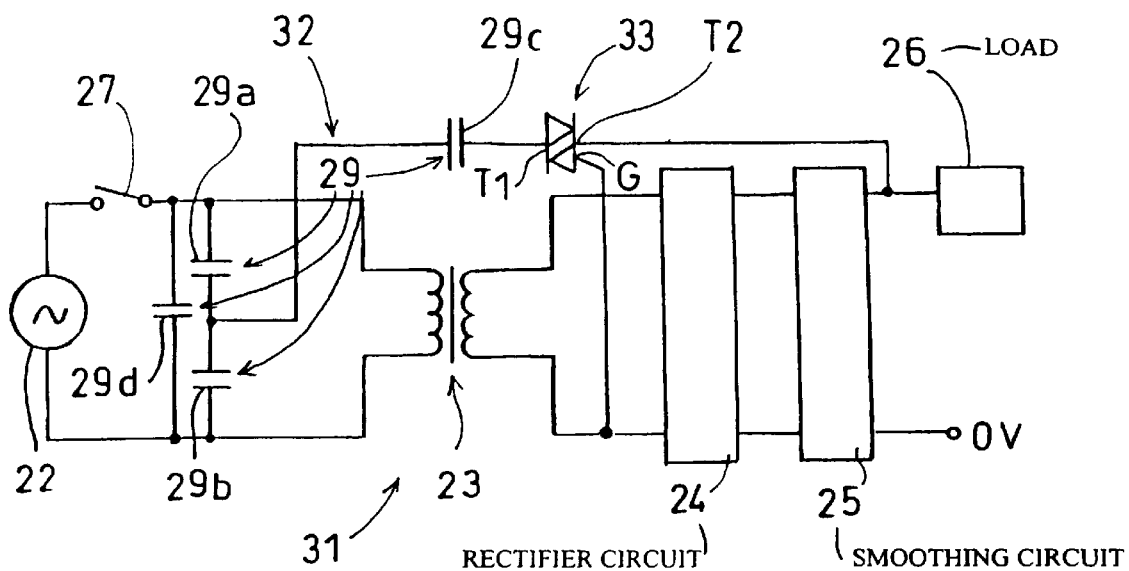
FIG. 3 is a circuit diagram showing a power supply with a noise canceling circuit in a first embodiment of the invention.

As shown in FIG. 3, the main electrode T1 is connected to the capacitor 29C. The main electrode T2 is connected to a line connecting the smoothing circuit 25 and the load 26, and the gate electrode G is connected to one end of the secondary side of the transformer 23.

In this embodiment, a circuit connecting the primary side and the secondary side of the transformer 23 via the filter portion 29 comprising the capacitors 29a to 29d and the triac 33 corresponds to the noise canceling circuit 32. When the rocker switch 27 is turned on, the AC current from the AC power supply 22 is stepped up or down by means of the transformer 23, and the AC current induced to the secondary side of the transformer 23 is rectified in the rectifier circuit 24. When this occurs, the induced AC current flows evenly through the gate electrode G of the triac 33, bringing the filter portion 29 and the secondary side of the transformer 23 into conduction. Noise included in the AC current from the AC power supply 22 is discharged to the secondary side of the transformer 33 via the capacitors 29a to 29d and the triac 33 that become conductive. A pulsing current taken from the rectifier circuit 24 is smoothed in the smoothing circuit 25 and converted to dc current, which is supplied to the load 26.

When the rocker switch 27 is off, the filter portion 29 and the secondary side of the transformer 23 are brought out of conduction because the current does not flow in the gate electrode G that is connected to the secondary side of the transformer 23. However, with the rocker switch 27 turned on, the noise is discharged to the secondary side of the transformer 23 via the capacitors 29a to 29d and the triac 33 that becomes conductive. Therefore, the noise canceling circuit 32 according to the invention enables noise to be eliminated from the AC current supplied from the AC power supply 22, and stable current to be supplied to the primary side of the transformer 23.

With the rocker switch 27 turned off, the filter portion 29 and the secondary side of the transformer 23 are brought out of conduct, and the current never flows to the secondary side of the transformer 23, and by extension never flows to the machine frame. Therefore, even when the operator touches the top surface of the bed portion 4, which is exposed from the cover 5, there is no danger of receiving an electrical shock.

The filter portion 29 and the secondary side of the transformer 23 can be brought into or out of conduction in accordance with an on-off state of the rocker switch 27 without the need for any control device such as a microcomputer. As mentioned, this may be achieved through the use of the triac 33, which has main electrode T1 connected to the capacitor 29c and main electrode T2 and gate electrode G connected to the secondary side of the transformer 23.

Figure 4:
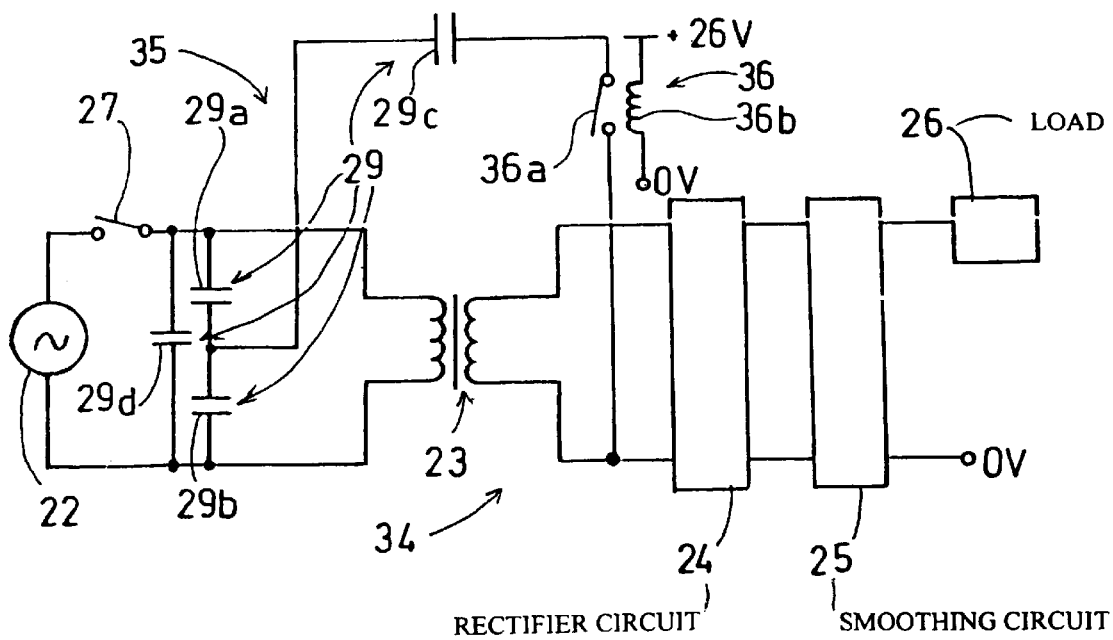
FIG. 4 is a circuit diagram showing a power supply with a noise canceling circuit in a second embodiment of the invention.
Figure 5:
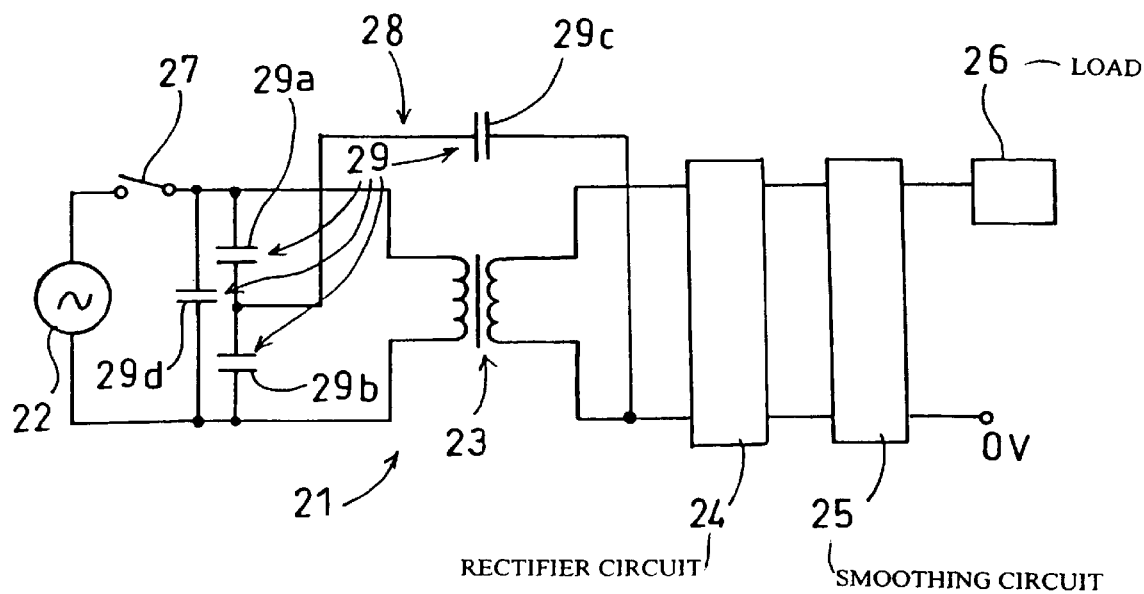
FIG. 5 is a circuit diagram showing a power supply with a noise canceling circuit of the prior art.

The triac 33 may be replaced with the relay 36 of the power supply 34 in a second embodiment shown in FIG. 4. In the second embodiment, parts having the same structure and functions as those of the prior art shown in FIG. 5 are identified with the same numerals and their descriptions are omitted.

A relay 36 of the second embodiment comprises a contact portion 36a, which is connected between the capacitor 29c of the filter portion 29 and one end of the secondary side of the transformer 23, and a coiled fixed portion 36b, which is insulated from the contact portion 36a.

One end of the fixed portion 36b is connected to a voltage source, preferably of +26V because of a single source operation. The other end is grounded to an appropriate place of the machine frame. In this case, the coil of the fixed portion 36b is connected to the control device (not shown), which enables control current to be supplied to or stopped at the coil of the fixed portion 36b in accordance with the on-off state of the rocker switch 27.

With this arrangement, when the rocker switch 27 is turned on, the control current flows through the coil of the fixed portion 36b, and the contact portion 36a is attracted against the fixed portion 36b, to close a contact of the contact portion 36a so that the filter portion 29 and the secondary side of the transformer 23 are brought into conduction. As the control current stops going through the coil of the fixed portion 36b with the rocker switch 27 turned off, the force of attraction of the fixed portion 36b is lost and the contact of the contact portion 36a is opened, so that the filter portion 29 and the secondary side of the transformer 23 are brought out of conduction.

Therefore, even in the second embodiment, when the rocker switch 27 is on, the noise included in the AC current from the AC power supply 22 is discharged to the secondary side of the transformer 23 via each capacitor 29a to 29d and the relay 36 that becomes conductive. Accordingly, a noise canceling circuit 35 of the second embodiment enables noise to be eliminated from the AC current supplied from the AC power supply 22, and stable current to be supplied to the primary side of the transformer 23.

With the rocker switch 27 turned off, the filter portion 29 and the secondary side of the transformer 23 are brought out of conduct, and the current never reaches the secondary side of the transformer 23, and by extension never reaches the machine frame as the grounding member. Therefore, even when the operator touches the top surface of the bed portion 4, which is exposed from the cover 5, there is no danger of receiving an electrical shock.

This invention is not limited to the above embodiments. For example, in the above embodiments, the filter portion 29 to eliminate the noise includes capacitors alone, but may include other elements, such as a capacitor and an inductor. Also, the rocker switch can be replaced with any other type of switch, such as a lever switch, pushbutton switch, or toggle switch, to switch the AC current from the AC power supply on or off.

What is claimed is:

1. A noise canceling circuit having a filter portion connecting a primary (input) side and a secondary (output) side of a transformer to eliminate noise included in an alternating (AC) current supplied at the primary side of the transformer, the noise canceling circuit further comprising:

a changeover device disposed between the filter portion and the secondary side of the transformer that brings the filter portion and the secondary side of the transformer into or out of conduction in accordance with an on-off state of a switching device disposed between an AC power supply and the noise canceling circuit.

2. The noise canceling circuit according to claim 1, wherein the filter portion is a capacitor.

3. The noise canceling circuit according to claim 1, wherein the filter portion is an inductor.

4. The noise canceling circuit according to claim 1, wherein the changeover device is a triac.

5. The noise canceling circuit according to claim 1, wherein the changeover device is a relay.

6. A power supply circuit comprising:

a transformer having a primary (input) side connected to a commercial alternating-current (AC) power supply and a secondary (output) side;

a rectifier circuit connected to the secondary side of the transformer;

a smoothing circuit connected to a direct-current output side of the rectifier circuit;

a noise canceling circuit connected to the primary side and the secondary side of the transformer via a filter portion to eliminate noise;

a switching device disposed between the AC power supply at the primary side and the noise canceling circuit; and a changeover device disposed between the noise canceling circuit and the secondary side of the transformer that brings the noise canceling circuit and the secondary side of the transformer into or out of conduction in accordance with an on-off state of the switching device.

7. The power supply circuit according to claim 6, wherein the changeover device is a triac.

8. The power supply circuit according to claim 6, wherein the changeover device is a relay.

* * * * *